(12) United States Patent
Montenguise et al.

(10) Patent No.: US 10,314,230 B2
(45) Date of Patent: Jun. 11, 2019

(54) FLAIL CHOPPER ASSEMBLY WITH SPRING TINES FOR AN AGRICULTURAL COMBINE

(71) Applicant: CNH Industrial America, LLC, New Holland, PA (US)

(72) Inventors: Justin L. Montenguise, Bettendorf, IA (US); Craig E. Murray, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 155 days.

(21) Appl. No.: 15/362,981

(22) Filed: Nov. 29, 2016

(65) Prior Publication Data

US 2018/0146621 A1    May 31, 2018

(51) Int. Cl.
*A01F 12/40* (2006.01)
*A01D 41/12* (2006.01)
*A01F 7/70* (2010.01)

(52) U.S. Cl.
CPC ............ *A01D 41/1243* (2013.01); *A01F 7/70* (2013.01); *A01F 12/40* (2013.01)

(58) Field of Classification Search
USPC ........................................................ 460/112
See application file for complete search history.

(56) References Cited

U.S. PATENT DOCUMENTS

| | | | |
|---|---|---|---|
| 1,759,905 A | 5/1930 | Keith | |
| 2,815,781 A | 12/1957 | Myrold et al. | |
| 3,039,505 A | 6/1962 | Mast | |
| 3,338,037 A | 8/1967 | Bauer et al. | |
| 3,455,398 A * | 7/1969 | Bowers | A01D 43/02 172/103 |
| 3,460,629 A * | 8/1969 | West | A01B 33/142 172/21 |
| 3,545,187 A | 12/1970 | Whitney | |

(Continued)

FOREIGN PATENT DOCUMENTS

| | | |
|---|---|---|
| CN | 102696364 | 10/2012 |
| DE | 4131895 | 7/1993 |

(Continued)

OTHER PUBLICATIONS

European Search Report for European Application No. 17203713.7, dated Apr. 19, 2018 (5 pages).

*Primary Examiner* — Thomas B Will
*Assistant Examiner* — Mai T Nguyen
(74) *Attorney, Agent, or Firm* — Peter K. Zacharias; Patrick M Sheldrake (57) ABSTRACT

A chopper assembly for a crop residue distribution system of an agricultural combine may include a rotor shaft extending lengthwise along a rotational axis between a first end and a second end. The chopper assembly may also include a plurality of flail blades pivotally coupled to the rotor shaft. Each flail blade may be configured to pivot relative to the rotor shaft about a pivot axis, with the flail blades being spaced apart axially from one another between the first and second ends of the rotor shaft. In addition, the chopper assembly may include a plurality of spring tines coupled to the rotor shaft, with the spring tines being spaced apart from one another between the first and second ends of the rotor shaft.

14 Claims, 6 Drawing Sheets

(56) References Cited

U.S. PATENT DOCUMENTS

| | | | |
|---|---|---|---|
| 3,693,335 A | | 9/1972 | Mathews |
| 3,779,251 A | | 12/1973 | Rowland-Hill et al. |
| 4,267,891 A | * | 5/1981 | van der Lely ......... A01B 39/14 |
| | | | 172/28 |
| 4,612,941 A | * | 9/1986 | Kunde ................... A01F 12/40 |
| | | | 241/241 |
| 4,802,536 A | * | 2/1989 | O'Neal ................ A01B 33/142 |
| | | | 172/119 |
| 5,272,861 A | | 12/1993 | Roynberg |
| 5,362,004 A | | 11/1994 | Bateman |
| 5,413,286 A | | 5/1995 | Bateman |
| 6,592,061 B2 | | 7/2003 | Watajima et al. |
| 6,783,453 B2 | | 8/2004 | Bueermann et al. |
| 6,840,854 B2 | * | 1/2005 | Redekop ................ A01F 12/40 |
| | | | 460/112 |
| 6,945,025 B2 | | 9/2005 | Morency et al. |
| 7,121,485 B2 | | 10/2006 | Smith |
| 7,337,601 B1 | | 3/2008 | Coffin |
| 7,546,966 B2 | * | 6/2009 | Lepage ................ A01F 29/005 |
| | | | 241/285.2 |
| 8,221,203 B1 | | 7/2012 | Flickinger et al. |
| 8,584,439 B2 | * | 11/2013 | Kuhn ................... A01D 89/002 |
| | | | 56/364 |
| 9,137,949 B2 | | 9/2015 | Isaac et al. |
| 2013/0327009 A1 | | 12/2013 | McClure et al. |

FOREIGN PATENT DOCUMENTS

| | | |
|---|---|---|
| EP | 1721514 A1 | 11/2006 |
| EP | 2225929 A1 | 9/2010 |
| EP | 3092891 A1 | 11/2016 |
| FR | 2241232 | 3/1975 |

\* cited by examiner

FLAIL CHOPPER ASSEMBLY WITH SPRING TINES FOR AN AGRICULTURAL COMBINE

FIELD OF THE INVENTION

The present subject matter relates generally to agricultural combines and, more particularly, to a flail chopper assembly having spring tines for use within a crop residue distribution system of an agricultural combine.

BACKGROUND OF THE INVENTION

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine. During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor. After discharge from the threshing system, the crop residue is typically directed into a crop residue distribution system located below and rearwardly of the rear end of the rotor. The crop residue distribution system typically includes a chopper assembly that conveys and/or chops and propels the residue rearwardly towards an area within the rear end of the combine, hereinafter referred to as a distribution chamber. The crop residue provided within the distribution chamber may either be discharged therefrom onto a field as a windrow or be directed into a chopper and/or spreader mounted on or at the rear end of the combine that is operable to spread the residue over a swath of a field.

Typically, the chopper assembly of a crop residue distribution system is configured to perform two primary functions: (1) chop the crop residue so that is can decompose quickly; and (2) convey the crop residue to the rear end of the combine. When it is desired to chop the crop residue and spread the resulting material back into the field, the chopper assembly is typically rotated at a high speed, which allows the chopper assembly to efficiently perform both of its functions. However, it is often desired to not chop the crop residue and, instead, collect it for baling. In such instances, the chopper assembly must be operated at a relatively low sped to prevent the crop residue from being chopped. Such low speed operation can negatively impact the ability of the chopper assembly to convey the crop residue towards the rear end of the combine, particularly when the chopper assembly corresponds to a flail chopper assembly having a plurality of flail blades pivotally coupled to a corresponding rotor shaft. With such chopper assemblies, the rotation of the rotor shaft at the low speed required to prevent chopping of the crop residue typically does not create enough force to maintain the flail blades at their extended, radially oriented position. As such, the flail blades tend to pivot backward during low speed operation, which significantly impacts the operating efficiency of the chopper assembly.

Accordingly, an improved flail chopper assembly for use within a crop residue distribution system of an agricultural combine that addresses one or more of the issues described above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a chopper assembly for a crop residue distribution system of an agricultural combine. The chopper assembly may include a rotor shaft extending lengthwise along a rotational axis between a first end and a second end. The chopper assembly may also include a plurality of flail blades pivotally coupled to the rotor shaft. Each flail blade may be configured to pivot relative to the rotor shaft about a pivot axis, with the flail blades being spaced apart axially from one another between the first and second ends of the rotor shaft. In addition, the chopper assembly may include a plurality of spring tines coupled to the rotor shaft, with the spring tines being spaced apart from one another between the first and second ends of the rotor shaft.

In another aspect, the present subject matter is directed to an agricultural combine. The combine may include a threshing system configured to separate crop residue from another crop material received by the threshing system. The combine may also include a crop residue distribution system configured to receive the crop residue discharged from the threshing system. The crop residue distribution system may include a chopper assembly having a rotor shaft extending lengthwise along a rotational axis between a first end and a second end. The chopper assembly may also include a plurality of flail blades pivotally coupled to the rotor shaft. Each flail blade may be configured to pivot relative to the rotor shaft about a pivot axis, with the flail blades being spaced apart axially from one another between the first and second ends of the rotor shaft. In addition, the chopper assembly may include a plurality of spring tines coupled to the rotor shaft, with the spring tines being spaced apart from one another between the first and second ends of the rotor shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved chopper assembly for use within a crop residue distribution system of an agricultural combine. Specifically, in accordance with aspects of the present subject matter, the disclosed chopper assembly corresponds to a flail-type chopper assembly including a plurality of flail blades pivotally coupled to a rotor shaft. Additionally, in several embodiments, the chopper assembly may include a plurality of spring tines coupled to the rotor shaft. The spring tines may generally be configured to function as an additional material conveying means during low speed operation. For example, in one embodiment, the spring tines may be installed on the chopper assembly at various axially spaced apart locations along the rotor shaft. In such an embodiment, in the event that one or more of the flail blades pivots backward during low speed operation, the spring tines may serve as the primary or an additional means of conveying crop residue through the chopper assembly. As such, the disclosed chopper assembly may allow for the effective and efficient conveyance of crop residue at both high and low operational speeds.

Figure 1:
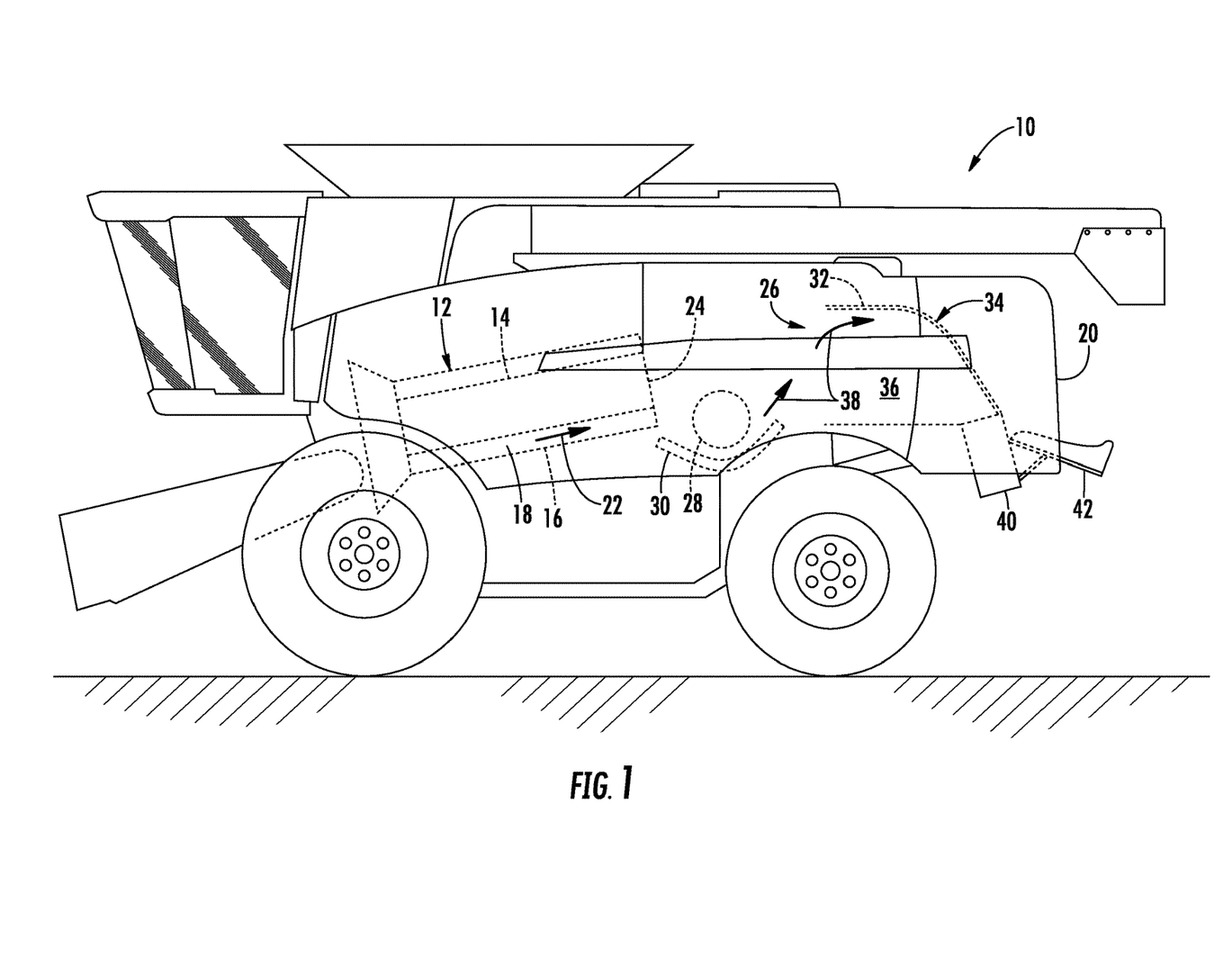
FIG. 1 illustrates a side view of one embodiment of an agricultural combine in accordance with aspects of the present subject matter.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 20 of the combine 10 (indicated by arrow 22), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at a downstream end 24 of the threshing system 12.

In addition, the combine 10 may include a crop residue distribution system 24 for expelling the crop residue from the combine 10. As shown, the distribution system 26 may include a chopper assembly 28 rotatably supported above a concave pan 30. As is generally understood, the chopper assembly 28 may be configured to be rotated to convey the flow of crop residue exiting the threshing system 12 towards the rear end 20 of the combine 10. As indicated above, in many instances, the chopper assembly 28 may be configured to be operated at a high rotational speed such that the crop residue is chopped and subsequently propelled towards the rear end 20 of the combine 10. Alternatively, the chopper assembly 28 may be operated at a relatively low rotational speed such that the crop residue is simply conveyed towards the rear end 20 of the combine 10 without being chopped.

In several embodiments, the crop residue may be conveyed or propelled along a series of internal shields or panels, such as a guide panel 32 (e.g., a strawhood) and a windrow door assembly 34, towards the rear end 20 of the combine 10. For instance, as shown in FIG. 1, the concave pan 30 may be angled in a manner such that the crop residue may be propelled rearwardly and upwardly from the chopper assembly 28 into a distribution chamber 36, wherein the residue is directed along the guide panel 32 towards the windrow door assembly 34 (indicated by arrow 38). Depending on whether the windrow door assembly 34 is in a closed or opened position, the crop residue may be directed through the distribution chamber 36 and into a crop residue chopper and/or spreader 40 for swath spreading (e.g., when the door is closed) or through a rear opening of the combine 10 for windrowing (e.g., when the door is opened).

Additionally, as shown in FIG. 1, the distribution system 26 may also include a windrow chute 42 at the rear end 20 of the combine 10 for distributing the crop residue expelled through the rear opening of the combine 10. For instance, a portion of the windrow door assembly 24 may be configured to deflect the flow of crop residue onto the windrow chute 42. The crop residue may then be decelerated as it travels along the windrow chute 42 before being dispensed onto a field as a windrow.

It should be appreciated that the configuration of the agricultural combine 10 described above and shown in FIG. 1 is provided only to place the present subject matter in an exemplary field of use. Thus, it should be apparent that the present subject matter may be readily adaptable to any manner of combine configuration.

Figure 2:
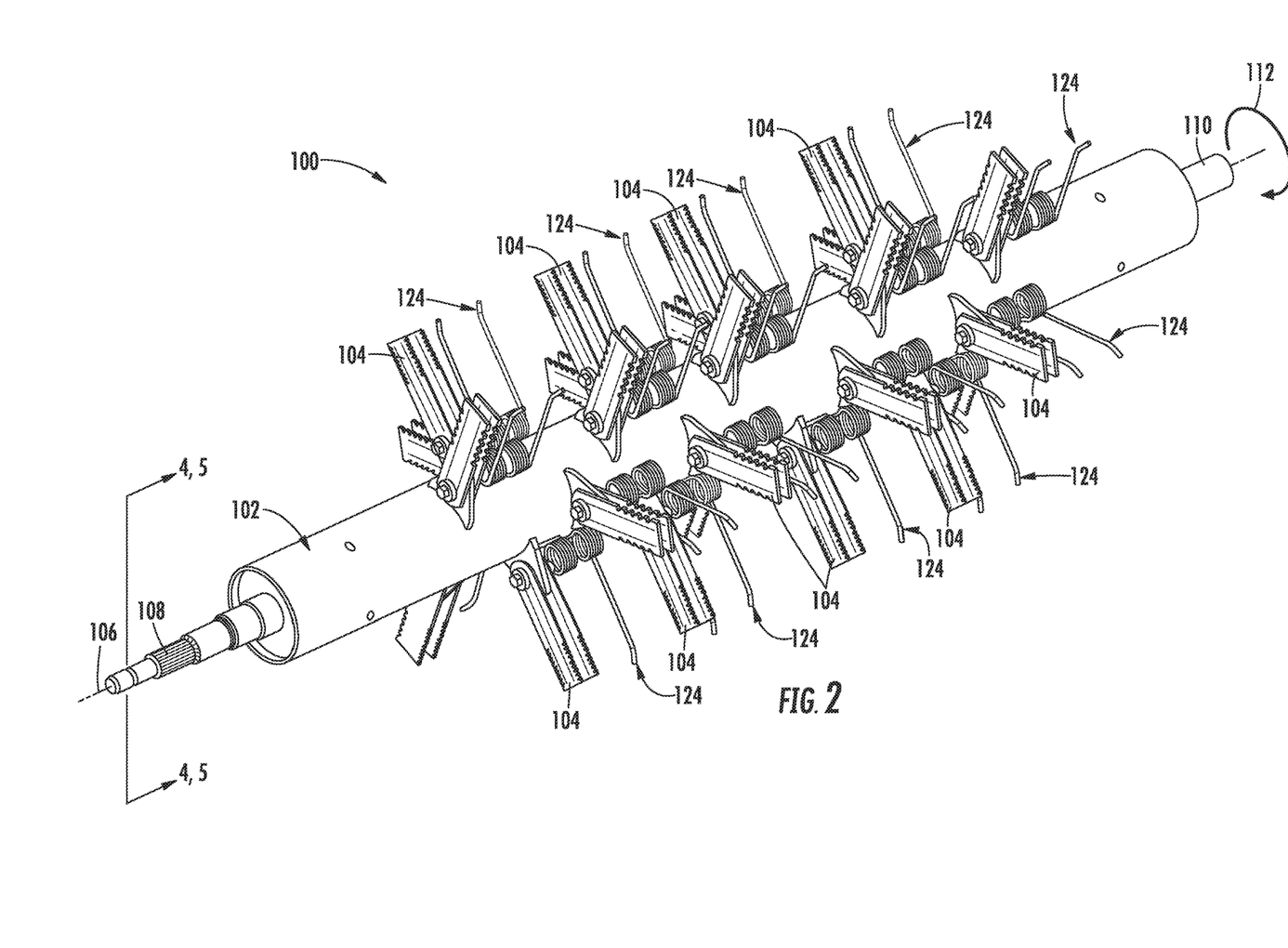
FIG. 2 illustrates a perspective view of one embodiment of a chopper assembly suitable for use within a crop residue distribution system of an agricultural combine in accordance with aspects of the present subject matter, particularly illustrating the chopper assembly including a plurality of spring tines coupled to the rotor shaft of the chopper assembly.
Figure 3:
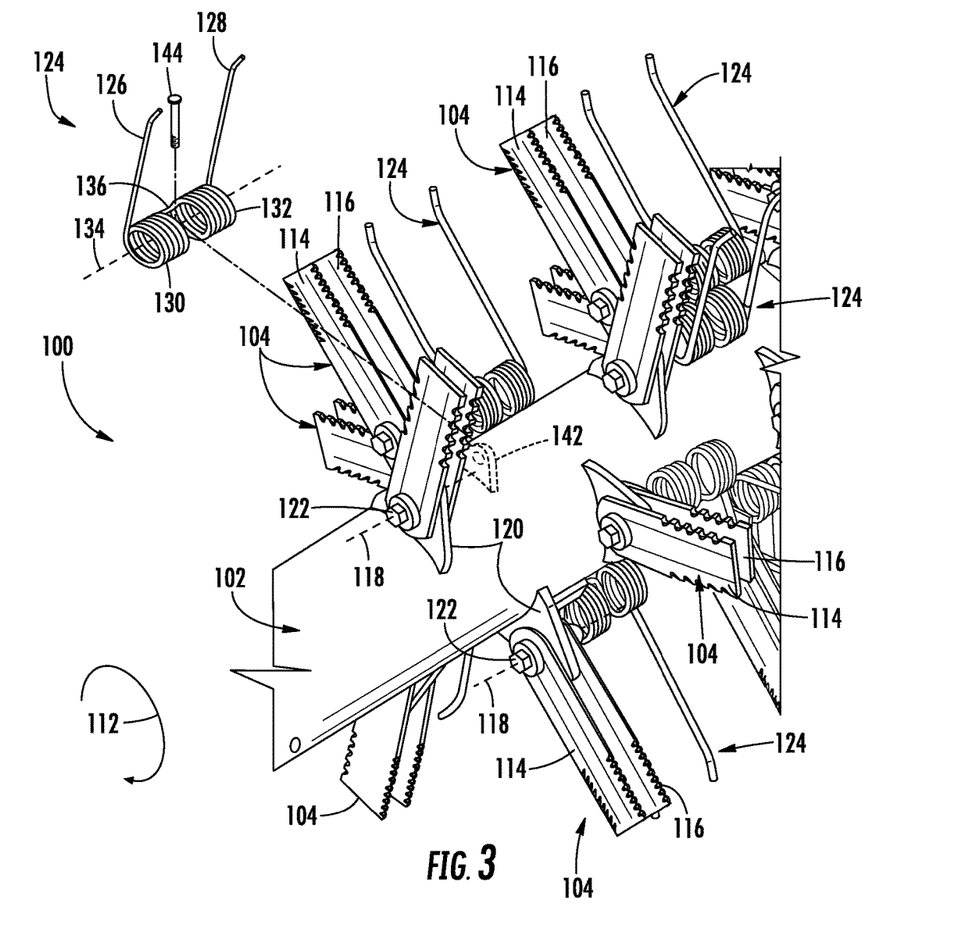
FIG. 3 illustrates a close-up, perspective view of a portion of the chopper assembly shown in FIG. 2, particularly illustrating one of the spring tines exploded away from the chopper assembly for purposes of illustration.
Figure 4:
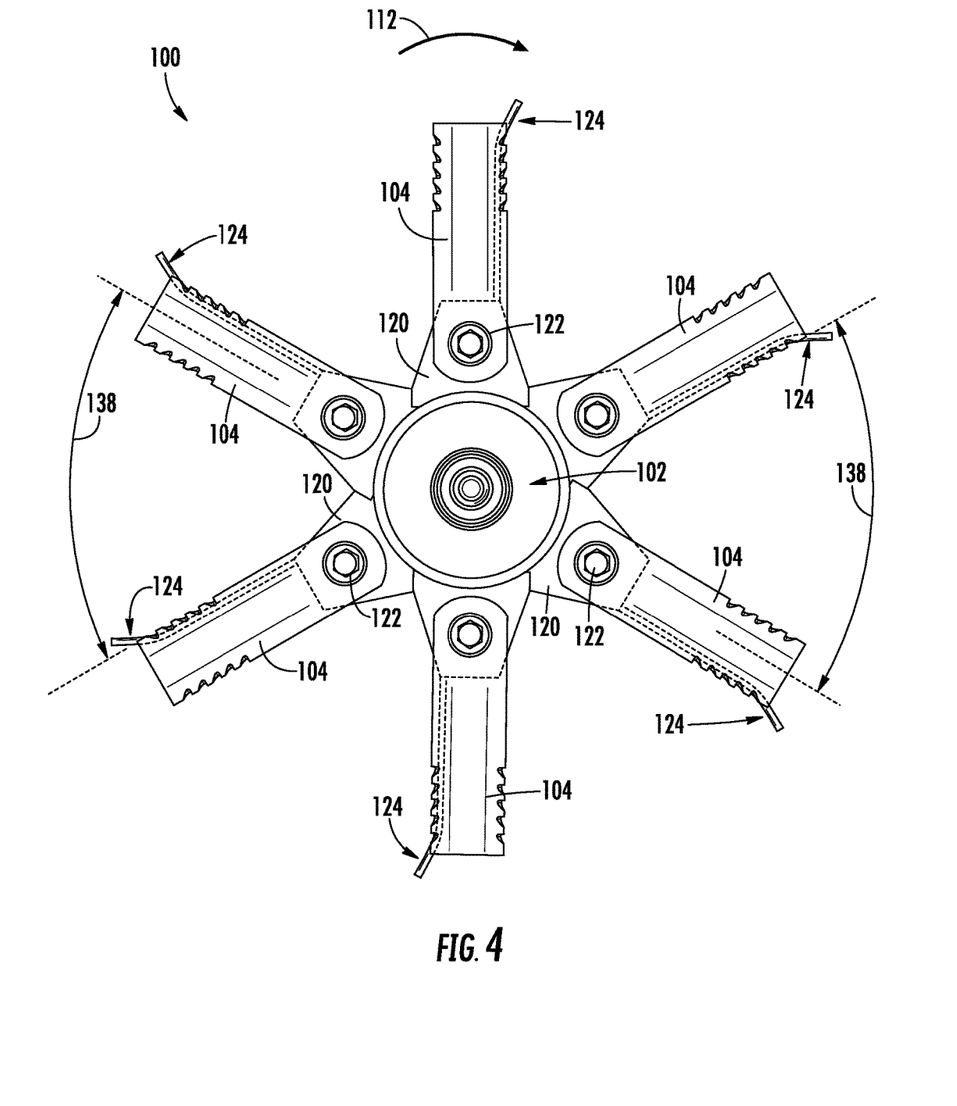
FIG. 4 illustrates a side cross-sectional view of the chopper assembly shown in FIG. 2 taken from the perspective of line 4/5-4/5, particularly illustrating the typical orientation of the flail blades of the chopper assembly during high speed operation.
Figure 5:
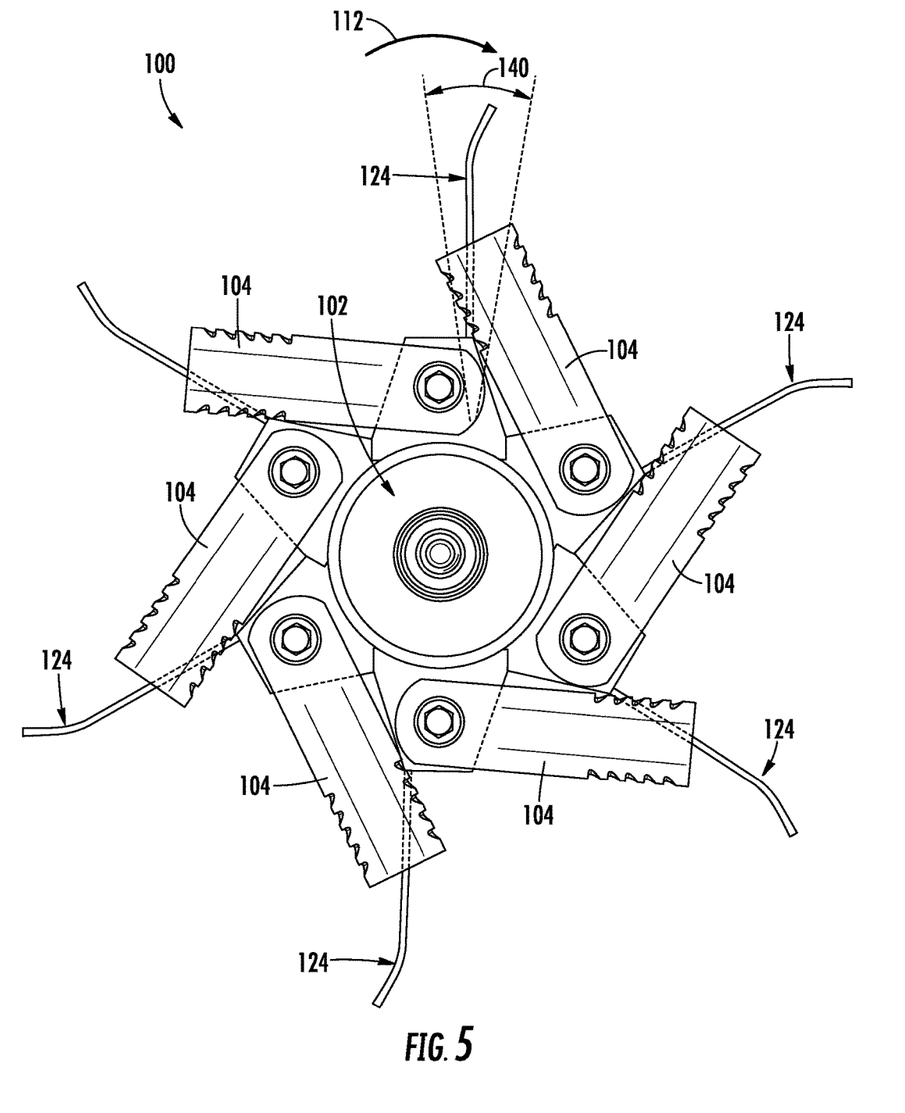
FIG. 5 illustrates another side cross-sectional view of the chopper assembly shown in FIG. 2 taken from the perspective of line 4/5-4/5, particularly illustrating the flail blades pivoted backwards, which may be indicative of the orientation of one or more of the flail blades during low speed operation.
Figure 6:
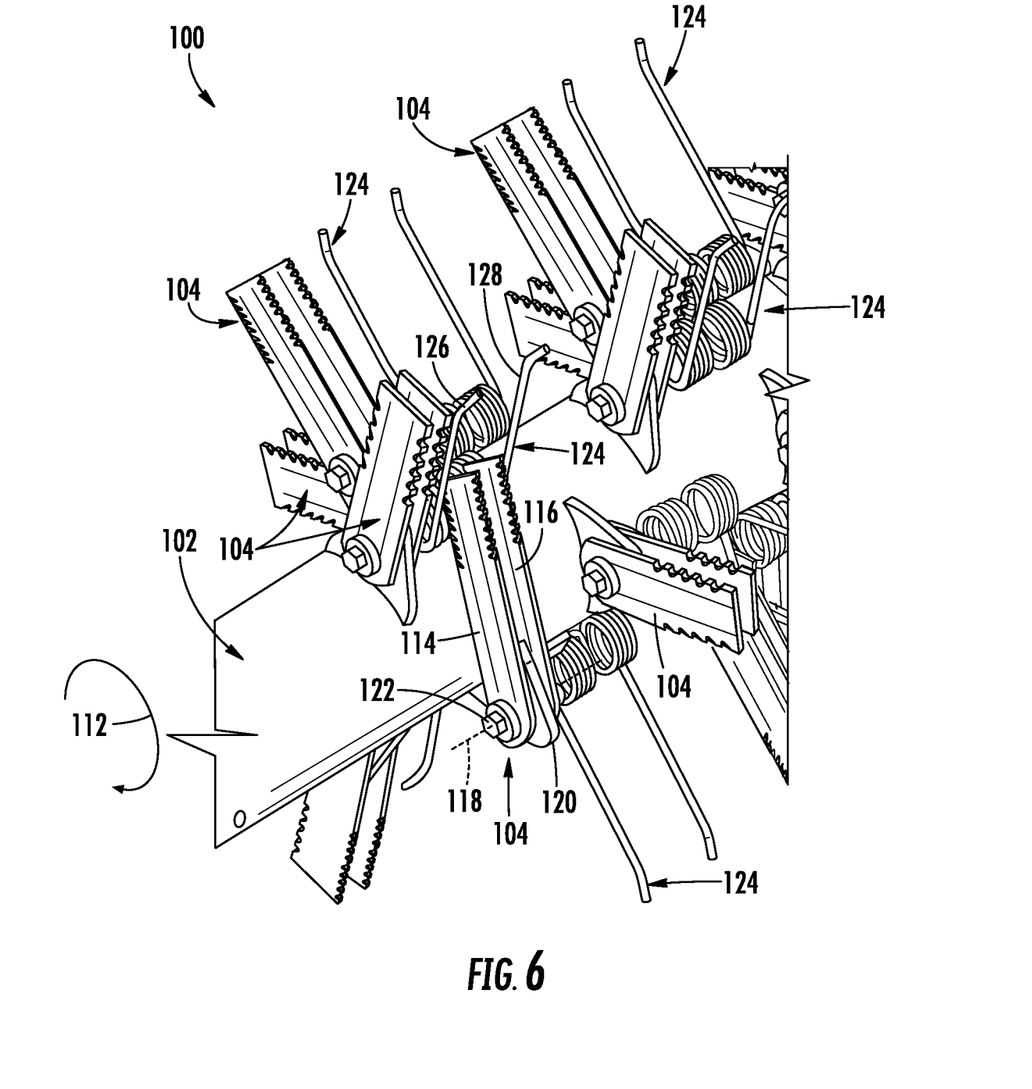
FIG. 6 illustrates another close-up, perspective view of a portion of the chopper assembly shown in FIG. 2, particularly illustrating one of the flail blades pivoted backwards towards an adjacent spring tine of the chopper assembly.

Referring now to FIGS. 2-6, one embodiment of a chopper assembly 100 suitable for use within a crop residue distribution system of an agricultural combine is illustrated in accordance with aspects of the present subject matter. Specifically, FIG. 2 illustrates a perspective view of the chopper assembly 100. FIG. 3 illustrates a close-up, perspective view of a portion of the chopper assembly 100 shown in FIG. 2, particularly illustrating a spring tine 124 of the chopper assembly exploded away for purposes of illustration. FIGS. 4 and 5 illustrate side, cross-sectional views of the chopper assembly 100 shown in FIG. 2 taken from the perspective of line 4/5-4/5, with FIG. 4 illustrating the typical orientation of flail blades 104 of the chopper assembly 100 during high speed operation of the chopper assembly 100 and FIG. 5 illustrating the flail blades 104 pivoted backwards, which may occur during low speed operation of the chopper assembly 100. Additionally, FIG. 6 illustrates another perspective view of the portion of the chopper assembly 100 shown in FIG. 3, particularly illustrating one of the flail blades 104 pivoted backwards towards an adjacent spring tine 124 of the chopper assembly 100.

As shown, the chopper assembly 100 may include a rotor shaft 102 and a plurality of flail blades 104 pivotally coupled to the rotor shaft 102. In general, the rotor shaft 102 may be configured to extend lengthwise along a longitudinal or rotational axis 106 between a first end 108 and a second end 110. As is generally understood, the axial ends 108, 110 of the rotor shaft 102 may be rotationally supported within the combine 10 such that the rotor shaft 102 may be rotated about its rotational axis 106 in a given rotational direction (e.g., as indicated by arrow 112 in FIGS. 2-6). Additionally, one or more of the ends 108, 110 of the rotor shaft 102 may be configured to be coupled to a suitable drive device (e.g., a motor) configured to rotationally drive the rotor shaft 102.

Each flail blade 104 of the chopper assembly 100 may generally include one or more blade members configured to be pivotally coupled to the rotor shaft 102 about a shared or common pivot axis. For instance, as particularly shown in FIG. 3, each flail blade 104 may include both a first blade member 114 and a second blade member 116 such that the flail blade 104 comprises a pair of blade members 114, 116 pivotally coupled to the rotor shaft 102 about a common pivot axis 118. However, in other embodiments, each flail blade 104 may include a single blade member pivotally coupled to the rotor shaft 102 or three or more blade members pivotally coupled to the rotor shaft 102 about a common pivot axis.

In general, the blade members 114, 116 may be configured to be coupled to the rotor shaft 102 using any suitable means. For instance, as particularly shown in FIG. 3, the chopper assembly 100 may include plurality of radially extending mounting flanges 120 coupled to the rotor shaft 102 (e.g., via welding or using suitable fasteners), with each mounting flange 120, in turn, being configured to couple one of the flail blades 104 to the rotor shaft 102. In such an embodiment, a pivot bolt 122 may be inserted through aligned pivot holes (not shown) defined in the mounting flange 120 and the blade members 114, 116 to allow the blade members 114, 116 to be pivotally coupled to the rotor shaft 102 via each mounting flange 120. As shown in FIG. 3, in embodiments in which each flail blade 104 includes a pair of blade members 114, 116, the blade members 114, 116 may, for example, be pivotally coupled along opposed sides of the adjacent mounting flange 120. It should be appreciated that a suitable retaining nut or any other suitable retaining feature may be coupled to one end of the pivot bolt 122 to maintain the pivot bolt 122 within the aligned openings defined through the blade members 114, 116 and the mounting flange 120.

In several embodiments, the flail blades 104 may be configured to be pivotally coupled to the rotor shaft 102 at various axially spaced apart locations between the opposed axial ends 108, 110 of the rotor shaft 102. For instance, as shown in FIG. 2, the chopper assembly 100 may, in one embodiment, include two pairs of flail blades 104 pivotally coupled to rotor shaft 102 at each axial location, with the flail blades 104 of each pair being circumferentially offset from one another by 180 degrees. In such an embodiment, the next adjacent pair of flail blades 104 may be circumferentially offset from the neighboring pair of flail blades 104 by a given offset angle (e.g., 60 degrees) so that the chopper assembly 100 includes a plurality of pairs of flail blades 104 coupled to the rotor shaft 102 that are both circumferentially and axially offset from any adjacent or neighboring pairs of flail blades 104. However, in other embodiments, the chopper assembly 100 may include a single flail blade 104 pivotally coupled to the rotor shaft 102 at each axial location or three or more flail blades 104 pivotally coupled to the rotor shaft 102 at each axial location. Additionally, it should be appreciated that the various flail blades 104 may generally have any suitable axial spacing relative to one another and/or may have any suitable circumferential positing relative to one another, including being circumferential aligned and/or being circumferentially offset by any suitable offset angle.

Referring particularly to FIGS. 4 and 5, during operation of the chopper assembly 100, the orientation of the flail blades 104 relative to the rotor shaft 102 may vary depending on the rotational speed of the rotor shaft 102 and/or whether any foreign objects are being conveyed through the chopper assembly 100. For instance, as shown in FIG. 4, during high speed operation, the centrifugal force caused by the rotation of the rotor shaft 102 typically results in the flail blades 104 being forced outwardly into a radially oriented position (e.g., such that the blade members 114, 116 are oriented substantially perpendicular to a tangent line defined on the outer surface of the rotor shaft 102 at the location of the pivotal connection between each flail blade 104 and the rotor shaft 102). This radial orientation allows the flail blades 104 to effectively and efficiently convey the crop reside as the rotor shaft 102 is being rotated. Additionally, during such high speed operation, a given flail blade 104 will typically only pivot backwards relative to the rotational direction 112 of the rotor shaft 102 when a foreign object (e.g., a rock) contacts the blade 104. However, during low speed operation, the centrifugal force caused by the rotation of the rotor shaft 102 is typically insufficient to force the flail blades 104 outward into their radially oriented position. As such, as crop residue is being conveyed though the chopper assembly 100, the flail blades 104 tend to pivot backwards relative to the rotational direction 112 of the rotor shaft 104, thereby reducing the effectiveness of the flail blades 104 in conveying the crop residue through the chopper assembly 100. For instance, FIG. 5 illustrates each of the flail blades 104 pivoted backwards to a maximum pivot position relative to the radially oriented position. At such position, the flail blades 104 typically exhibit extremely low material conveying efficiency.

As indicated above, to address such backward pivoting or retraction of the flail blades 104, the disclosed chopper assembly 100 may include a plurality of spring tines 124 coupled to the rotor shaft 102 at various locations to provide an additional conveying means for the chopper assembly 100 during low speed operation. In several embodiments, each spring tine 124 may include one or more tine fingers 126, 128 extending outwardly from one or more coiled springs 130, 132 configured to be positioned adjacent to and/or coupled to the rotor shaft 102. For example, as particularly shown in FIG. 3, each spring tine 124 may include a first tine finger 126 and a second tine finger 128, with the first tine finger 126 extending outwardly from a first coiled spring portion 130 of the spring tine 124 and the second tine finger 128 extending outwardly from a second coiled spring portion 132 of the spring tine 124. In such an embodiment, the coiled spring portions 130, 132 may, for example, both be helically wound about a common spring axis 134 such that the coils are aligned in generally parallel planes. Additionally, a connector arm 136 may extend between the first and second coiled spring portions 130, 132 to couple the spring portions 130, 132 to each other. However, it should be appreciated that the spring tines 124 described herein may have any other suitable configuration, such as by including a single tine finger extending outwardly from a corresponding coiled spring portion.

As is generally understood, the coiled spring portions 130, 132 of each spring tine 124 may be configured to allow the corresponding tine fingers 126, 128 to flex or bow when a sufficient force is applied against the tine fingers 126, 128. For instance, a given number of turns or coils may be formed along each coiled spring portion 130, 132 to provide the desired spring flexibility for the tine fingers 126, 128. In one embodiment, such desired flexibility may be selected so that the tine fingers 126, 128 have sufficient rigidity to function as an efficient and effective means for conveying crop residue through the chopper assembly 100 while still allowing the tine fingers 126, 128 to flex or deform backward when a foreign object contacts the tine fingers 126, 128.

In general, the spring tines 124 may be positioned at any suitable location on the rotor shaft 102. Specifically, in several embodiments, the spring tines 124 may be spaced apart axially along the length of the rotor shaft 102, with each spring tine 124 being positioned at one of the axial locations of the flail blades 104 so that a portion of each spring tine 124 is axially aligned with the flail blade(s) 104 installed at such location. For instance, in the view shown in FIG. 6, the chopper assembly 100 is shown as including spring tines 124 coupled to the rotor shaft 102 at the same axial location as each corresponding flail blade 104 such that each spring tine 124 and flail blade 104 are axially aligned with one another.

As shown in the illustrated embodiment, a spring tine 124 may be coupled to the rotor shaft 102 at each axial location of the various flail blades 104 of the chopper assembly 100. Alternatively, the spring tines 124 may be provided at selected axial locations along the rotor shaft 102 such that chopper assembly 100 includes one or more flail blades 104 that are axially aligned with a corresponding spring tine 124 and one or more flail blades 104 that are not axially aligned with a corresponding spring tine 124. It should also be appreciated that, in other embodiments, the spring tines 124 may be located at any other suitable location relative to the flail blades 104, such as by positioning the spring tines 124 at locations along the rotor shaft 102 that are axially offset from adjacent or neighboring flail blades 104.

In embodiments in which the spring tines 124 are axially aligned with corresponding flail blades 104, each spring tine 124 may be circumferentially offset from its axially aligned flail blade 104 in a direction opposite the rotational direction 112 of the rotor shaft 102. Specifically, as shown in FIG. 4, each spring tine 124 may be circumferentially offset from its corresponding flail blade 104 by an offset angle 138 extending in the direction opposite the rotational direction 112 of the rotor shaft 102. In one embodiment, the offset angle 138 may be selected such that, when the flail blade 104 is retracted or pivoted to its maximum pivot position (e.g., as shown in FIG. 5), the flail blade 104 does not contact its corresponding, axially aligned spring tine 124. In such an embodiment, the particular offset angle 138 defined between each flail blade 104 and its corresponding spring tine 124 may generally vary depending on the length of the flail blade 104, the diameter of the rotor shaft 102, the pivot range of the flail blade 104 and/or any other suitable factors. However, in one embodiment, the offset angle 138 may generally range from 30 degrees to 120 degrees, such as from 40 degrees to 100 degrees, or from 45 degrees to 75 degrees and/or any other suitable subranges therebetween.

Additionally, in one embodiment, the offset angle 138 may be selected so that a portion of each flail blade 104 circumferentially overlaps a portion of its axially aligned spring tine 124 when the flail blade 104 is fully retracted. For instance, as particularly shown in FIG. 6, each spring tine 124 may be circumferentially spaced from its corresponding flail blade 104 so that a portion of the blade members 114, 116 of the flail blade 104 are received between the tine fingers 126, 128 of the axially aligned spring tine 124 without contacting the coiled spring portions 130, 132 of the spring tine 124 when the flail blade 104 pivots back to its maximum pivot position.

It should be appreciated that, when the spring tines 124 are installed onto the rotor shaft 102, the tine fingers 126, 128 of each spring tine 124 may generally be configured to have any suitable orientation relative to the rotor shaft 102. However, in several embodiments, the tine fingers 126, 128 may be configured to be substantially radially oriented when the tine fingers are in an unloaded state (e.g., when the chopper assembly 100 is not operating). For instance, as shown in FIG. 5, the tine fingers 126, 128 may be configured to have an unloaded orientation that falls within a given angular range 140 defined relative to the radial direction of the rotor shaft 102. In one embodiment, the angular range 140 may correspond to plus or minus 20 degrees relative to the radial direction of the rotor shaft 102, such as plus or minus 15 degrees relative to the radial direction, or plus or minus 10 degrees relative to the radial direction or plus or minus 5 degrees relative to the radial direction and/or any other suitable subranges therebetween.

By installing one or more spring tines 124 on the rotor shaft 102 as described above, the spring tines 124 may improve the material conveying capabilities of the chopper assembly 100 during low speed operation. Specifically, when one or more of the flail blades 104 pivot backwards from the radially oriented position, the spring tines 124 may function as an additional material conveying means to ensure that the chopper assembly 100 continues to effectively and efficiently convey crop residue through the chopper assembly 100 towards the rear end 20 of the combine 10.

Moreover, by axially aligning each spring tine 124 at a location circumferentially behind a corresponding flail blade 104, the flail blades 104 may function to at least partially protect the trailing spring tines 124 during an operational event including a foreign object. For instance, when a foreign object is transferred through the chopper assembly 100, the leading flail blade 104 may absorb all or a portion of the energy from the impact with the foreign object as the flail blade 104 retracts or pivots backwards, thereby reducing the likelihood of damage occurring to the trailing spring tine 124. As such, due to the protection provided by the flail blades 104, the spring tines 124 may be designed to be less flexible (i.e., more rigid) than typical spring tines 124, thereby allowing the spring tines 124 to provide increased material conveying capabilities to the chopper assembly 100.

It should be appreciated that, in general, the spring tines 124 may be configured to be coupled to the rotor shaft 102 for rotation therewith using any suitable coupling or attachments means. For instance, in in embodiment, each spring tine 124 may be configured to be coupled to the rotor shaft 102 via the pivot bolt 122 of an adjacent flail blade 104. Specifically, as shown in the illustrated embodiment, each spring tine 124 may be circumferentially offset from its axially aligned flail blade 104 by the same offset angle as an adjacent flail blade 104 of the chopper assembly 100. In such an embodiment, each spring tine 124 may be positioned on the rotor shaft 102 so as to be circumferentially aligned with the adjacent flail blade 104 to allow the pivot bolt 122 of such adjacent flail blade 104 to be used as a means for coupling the spring tine 124 to the rotor shaft 102. For example, the pivot bolt 122 may be inserted through the adjacent spring tine 124 along the common spring axis 134 defined by the coiled spring portions 130, 132.

Alternatively, the spring tines 124 may be coupled to the rotor shaft 102 using any other suitable means, such as by welding the spring tines 124 to the rotor shaft 102 or by using a suitable tine mount or fastener to secure each spring tine 124 to the rotor shaft 102. For instance, as shown in dashed lines in FIG. 3, a suitable mounting flange 142 (e.g., similar to the mounting flanges 120 used to couple the flail blades 104 to the rotor shaft 102) may be coupled to the rotor shaft 102 (e.g., via welding) to provide a means for securing the spring tines 124 to the shaft 102. In such an embodiment, the mounting flange 142 may, for example, be configured to extend radially within the axial space defined between the coiled spring portions 130, 132. A suitable fastener or mounting component (e.g., bolt 144 shown in FIG. 3) may then be coupled between the mounting flange 142 and the spring tine 124 to couple the tine 124 to the rotor shaft. Alternatively, the spring tine 124 may be mounted directly to the mounting flange 142, such as by welding the components together. Moreover, other mounting configurations that may be used for coupling the spring tines 124 to the rotor shaft 102 are disclosed, for example, in U.S. Pat. No. 9,192,101 to McClure at el., entitled "Pick-Up Tine Bracket with Flange" and U.S. Pat. No. 8,051,636 to McClure at el., entitled "Pick-Up Reel Tine Mounting," the disclosures of both of which are hereby incorporated by reference herein in their entirety for all purposes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A chopper assembly for a crop residue distribution system of an agricultural combine, the chopper assembly comprising:
    a rotor shaft extending lengthwise along a rotational axis between a first end and a second end;
    a plurality of flail blades pivotally coupled to the rotor shaft, each flail blade configured to pivot relative to the rotor shaft about a pivot axis, the plurality of flail blades being spaced apart axially from one another between the first and second ends of the rotor shaft; and
    a plurality of spring tines coupled to the rotor shaft, the plurality of spring tines being spaced apart from one another between the first and second ends of the rotor shaft, each spring tine being axially aligned with and circumferentially offset from a respective flail blade of the plurality of the flail blades,
    wherein:
    each of the plurality of flail blades is configured to pivot relative to the rotor shaft from a radially oriented position to a maximum pivot position; and
    each spring tine is positioned relative to the respective flail blade such that a portion of at least one blade member of the respective flail blade circumferentially overlaps a portion of the spring tine when the respective flail blade pivots towards the spring tine to the maximum pivot position.

2. The chopper assembly of claim 1, wherein each spring tine is circumferentially offset from the respective flail blade by an offset angle ranging from 30 degrees to 120 degrees.

3. The chopper assembly of claim 2, wherein the rotor shaft is configured to be rotated in a rotational direction about the rotational axis, each spring tine being circumferentially offset from the respective flail blade by the offset angle in a direction opposite the rotational direction of the rotor shaft.

4. The chopper assembly of claim 1, wherein the portion of at least one blade member of the respective flail blade is positioned between opposed tine fingers of the spring tine when the respective flail blade pivots towards the spring tine to the maximum pivot position.

5. The chopper assembly of claim 1, wherein the each spring tine is circumferentially aligned with an adjacent flail blade of the plurality of flail blades, the adjacent flail blade being axially and circumferentially offset from the respective flail blade.

6. The chopper assembly of claim 1, wherein each spring tine includes at least one coiled spring portion and at least one tine finger extending outwardly from the at least one coiled spring portion.

7. The chopper assembly of claim 6, wherein the at least one tine finger is configured to flex relative to the at least coiled spring portion.

8. The chopper assembly of claim 6, wherein each spring tine is coupled to the rotor shaft such that the least one tine finger is oriented at an angle relative to a radial direction of the rotor shaft that falls within an angular range of plus or minus 20 degrees from the radial direction when the at least one tine finger is in an unloaded state.

9. An agricultural combine, comprising:
    a threshing system configured to separate crop residue from another crop material received by the threshing system; and
    a crop residue distribution system configured to receive the crop residue discharged from the threshing system, the crop residue distribution system including a chopper assembly, the chopper assembly comprising:
        a rotor shaft extending lengthwise along a rotational axis between a first end and a second end;
        a plurality of flail blades pivotally coupled to the rotor shaft, each flail blade configured to pivot relative to the rotor shaft about a pivot axis, the plurality of flail blades being spaced apart axially from one another between the first and second ends of the rotor shaft; and
    a plurality of spring tines coupled to the rotor shaft, the plurality of spring tines being spaced apart from one another between the first and second ends of the rotor shaft, each spring tine being axially aligned with and circumferentially offset from a respective flail blade of the plurality of the flail blades,
    wherein:
    each of the plurality of flail blades is configured to pivot relative to the rotor shaft from a radially oriented position to a maximum pivot position; and each spring tine is positioned relative to the respective flail blade such that a portion of at least one blade member of the respective flail blade circumferentially overlaps a portion of the spring tine when the respective flail blade pivots towards the spring tine to the maximum pivot position.

10. The agricultural combine of claim 9, wherein each spring tine is circumferentially offset from the respective flail blade by an offset angle ranging from 30 degrees to 120 degrees.

11. The agricultural combine of claim 10, wherein the rotor shaft is configured to be rotated in a rotational direction about the rotational axis, each spring tine being circumferentially offset from the respective flail blade by the offset angle in a direction opposite the rotational direction of the rotor shaft.

12. The agricultural combine of claim 9, wherein the each spring tine is circumferentially aligned with an adjacent flail blade of the plurality of flail blades, the adjacent flail blade being axially and circumferentially offset from the respective flail blade.

13. The agricultural combine of claim 9, wherein each spring tine includes at least one coiled spring portion and at least one tine finger extending outwardly from the at least one coiled spring portion.

14. The agricultural combine of claim 13, wherein each spring tine is coupled to the rotor shaft such that the least one tine finger is oriented at an angle relative to a radial direction of the rotor shaft that falls within an angular range of plus or minus 20 degrees from the radial direction when the at least one tine finger is in an unloaded state.

* * * * *